US007931042B2

(12) United States Patent
Kojima et al.

(10) Patent No.: US 7,931,042 B2
(45) Date of Patent: Apr. 26, 2011

(54) VACUUM SUCTION SYSTEM AND METHOD OF CONTROLLING THE SAME

(75) Inventors: Tomoyuki Kojima, Tokyo-To (JP); Shigeru Matsukawa, Tokyo-To (JP); Hiroaki Abe, Tokyo-To (JP)

(73) Assignee: Tokyo Weld Co., Ltd., Tokyo (JP)

( * ) Notice: Subject to any disclaimer, the term of this patent is extended or adjusted under 35 U.S.C. 154(b) by 1434 days.

(21) Appl. No.: 10/758,012

(22) Filed: Jan. 16, 2004

(65) Prior Publication Data

US 2004/0145103 A1 Jul. 29, 2004

(30) Foreign Application Priority Data

Jan. 20, 2003 (JP) ................................ 2003-011070

(51) Int. Cl.
*F17D 3/01* (2006.01)

(52) U.S. Cl. .......................... 137/12; 137/487.5; 269/21

(58) Field of Classification Search ............... 137/487.5, 137/12; 269/21
See application file for complete search history.

(56) References Cited

U.S. PATENT DOCUMENTS

| | | | |
|---|---|---|---|
| 5,191,218 A * | 3/1993 | Mori et al. | 250/453.11 |
| 5,842,579 A * | 12/1998 | Garcia et al. | 209/573 |
| 5,961,169 A * | 10/1999 | Kalenian et al. | 294/64.1 |
| 6,220,481 B1 * | 4/2001 | Miyamoto | 221/167 |
| 6,448,525 B1 * | 9/2002 | Nishioka et al. | 209/574 |
| 2001/0008061 A1 * | 7/2001 | Arishiro et al. | 53/54 |

FOREIGN PATENT DOCUMENTS

| | | |
|---|---|---|
| JP | 3-162310 A | 7/1991 |
| JP | 5-51001 A1 | 3/1993 |
| KR | 10-0254781 B1 | 2/2000 |
| KR | 10-2002-0011339 A | 2/2002 |

* cited by examiner

*Primary Examiner* — Stephen M Hepperle
*Assistant Examiner* — William McCalister
(74) *Attorney, Agent, or Firm* — Birch, Stewart, Kolasch & Birch, LLP

(57) ABSTRACT

A vacuum suction system comprises a work conveyor table 2 having work receiving openings 5, and a table base 3 having vacuum suction channels 7 which communicate with the work receiving openings 5 of the conveyor table 2. The work receiving openings 5 and the vacuum suction channels 7 communicate with a vacuum generation source 17 via a vacuum pipe 9. A negative pressure sensor 10 is disposed on the vacuum pipe 9. Based on a signal from the negative pressure sensor 10, a compressed air generation source 20 supplies a compressed air to the vacuum pipe 9 and thereby stabilizes the vacuum level in the vacuum pipe 9.

13 Claims, 3 Drawing Sheets

VACUUM SUCTION SYSTEM AND METHOD OF CONTROLLING THE SAME

This Nonprovisional application claims priority under 35 U.S.C. §119(a) on Patent Application No(s). 2003-011070 filed in Japan on Jan. 20, 2003, the entire contents of which are hereby incorporated by reference.

FIELD OF THE INVENTION

This invention relates to a vacuum suction system and a method of controlling the same, for sucking works, including electronic parts such as chip parts, into a work receiving opening.

RELATED ART

FIGS. 5, 6, and 7 illustrate a conventional vacuum suction system for sucking a work into a work receiving opening. FIG. 5 is a vertical cross-sectional drawing showing an example of a part of the vacuum suction system using a conveyor table. FIG. 6 shows the piping system of the vacuum suction system part illustrated in FIG. 5, while FIG. 7 is a time chart explaining the relationship between the load ratio and the vacuum level.

In FIG. 5, a conveyor table 2 is rotatably disposed on top of a table base 3, while the table base 3 is fixedly disposed on a base 4. In addition, there is a plurality of work receiving openings 5 arranged in a circle and penetrating through the conveyor table 2. The work receiving openings 5 constitute a plurality of rows of concentric receiving openings.

Vacuum suction channels 30 are disposed in the table base 3. The vacuum suction channels 30 penetrate through the table base 3 and the base 4 to connect with a vacuum pipe 9 via a vacuum suction opening 8. The vacuum pipe 9 connects with the vacuum generation source 17 as shown in FIG. 6. A negative pressure detection sensor 31 is disposed between the vacuum suction channels 30 and the vacuum generation source 17. Further, the vacuum suction channels 30 are formed of circles concentric with the rows of receiving openings 5, and each vacuum suction channel 30 connects with a part of the plurality of work receiving openings 5 formed in the rows.

A work discharge part is also disposed on the conveyor table 2. As shown in FIG. 5, a jet nozzle 11 is disposed on the work discharge part and penetrates through the table base 3 and the base 4. The jet nozzle 11 connects to a compressed air controlling means (not shown) via a compressed air pipe 12.

As shown in FIGS. 5 to 7, the vacuum suction channels 30 are connected to the vacuum generation source 17 via the vacuum pipe 9 and the vacuum suction opening 8. The vacuum generation source 17 creates a state of negative pressure in the vacuum suction channels 30, and as a result the work receiving openings 5 connected to the vacuum suction channels 30 are negatively pressurized. Works W that are placed on the conveyor table 2 or in contact with the conveyor table 2 are loaded into the work receiving openings 5 due to the negative pressure of the work receiving openings 5.

Leakage occurs between the work receiving openings 5 and the vacuum suction channels 30, and therefore when all the work receiving openings 5 are loaded with works W, the vacuum level in the vacuum suction channels 30 is at its maximum level (hereinafter "maximum vacuum level P5"). When none of the work receiving openings 5 is loaded with works W and all the work receiving openings 5 remain open, the vacuum level in the vacuum suction channels 30 is at its minimum vacuum level (see FIG. 7).

In the conventional vacuum suction systems, even when all of the work receiving openings 5 are in open positions and the vacuum level is at the minimum level, the minimum level in the vacuum suction channel 30 is set at a level adequate to suck the works W into the work receiving holes 5 and load them. However, the work receiving openings 5 are connected directly to the vacuum suction channels 30 and since the flow channel resistance between the work receiving openings 5 and the vacuum suctions channels 30 is low, even if only some of the work receiving openings 5 are not loaded with works W, the drop in the vacuum level from the maximum vacuum level P5 becomes very large. In such a case, in order to maintain a minimum vacuum level needed to load works W, the maximum vacuum level P5 becomes extremely high. Then, when compressed air is jetted from the jetting nozzle 11 to discharge the work W, the compressed air and the suction power offset each other and there are cases when the works W cannot be discharged. In addition, when the suction power on the works W rises, the friction between the work W and the table base 3 also increases, while the conveyor table 2 and the table base 3 become sucked together due to the air suction between them, which in turn impedes the rotation of the conveyor table 2.

SUMMARY OF THE INVENTION

An object of the present invention is to provide a vacuum suction system and a method of controlling the same that are capable of ensuring that the works are loaded securely into a conveyor table, the works are steadily conveyed by the conveyor table and the works are properly discharged.

A vacuum suction system according to the present invention comprises a vacuum leak generation part, a vacuum generation mechanism connected to the vacuum leak generation part, and a vacuum level adjustment mechanism connected to the vacuum generation mechanism to adjust a vacuum level of the vacuum leak generation part.

The vacuum leak generation part may include a conveyor table having a work receiving opening for receiving a work.

The vacuum leak generation part may include a table base disposed on the side of the vacuum generation mechanism of the conveyor table, with a vacuum suction channel to connect with the work receiving opening.

The vacuum suction system may have a minute sectional suction channel located between the vacuum suction channel and the work receiving opening on the side of the table base of the conveyor table.

The vacuum level adjustment mechanism may include a negative pressure sensor to detect the vacuum level of the vacuum leak generation part, a compressed air generation source for generating a compressed air, and an adjustment part to jet out the compressed air from the compressed air generation source to the vacuum leak generation part based on a signal from the negative pressure sensor.

The adjustment part may jet out the compressed air based on the signal from the negative pressure sensor when the vacuum level rises above a maximum level, and stop the compressed air when the vacuum level falls below a minimum level.

A method of controlling a vacuum suction system comprises a vacuum leak generation part, a vacuum generation mechanism connected to the vacuum leak generation part, and a vacuum level adjustment mechanism connected to the vacuum generation mechanism for adjusting a vacuum level of the vacuum leakage generation part, and including a negative pressure sensor to detect the vacuum level of the vacuum leak generation part, a compressed air generation source, and an adjustment part, the method comprising the steps of: generating a vacuum in the vacuum leakage generation part by the vacuum generation mechanism, detecting the vacuum level of the vacuum leakage generation part by the negative pressure sensor of the vacuum level adjustment mechanism, and jetting out a compressed air from the compressed air generation source to the vacuum leak generation part by the adjustment part of the vacuum level adjustment mechanism based on a signal from the negative pressure sensor.

The adjustment part may jet out the compressed air based on the signal from the negative pressure sensor when the vacuum level rises above a maximum level, and stop the compressed air when the vacuum level falls below a minimum level.

The adjustment part may jet out the compressed air intermittently based on the signal from the negative pressure sensor when the vacuum level rises above the maximum level.

PREFERRED EMBODIMENT OF THE INVENTION

Figure 1:
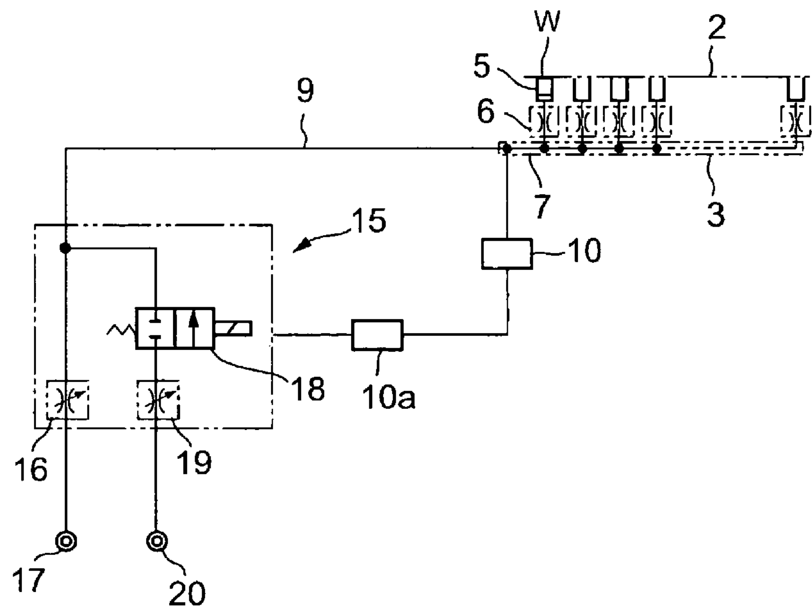
FIG. 1 shows a piping of a vacuum suction system of the present invention.
Figure 2:
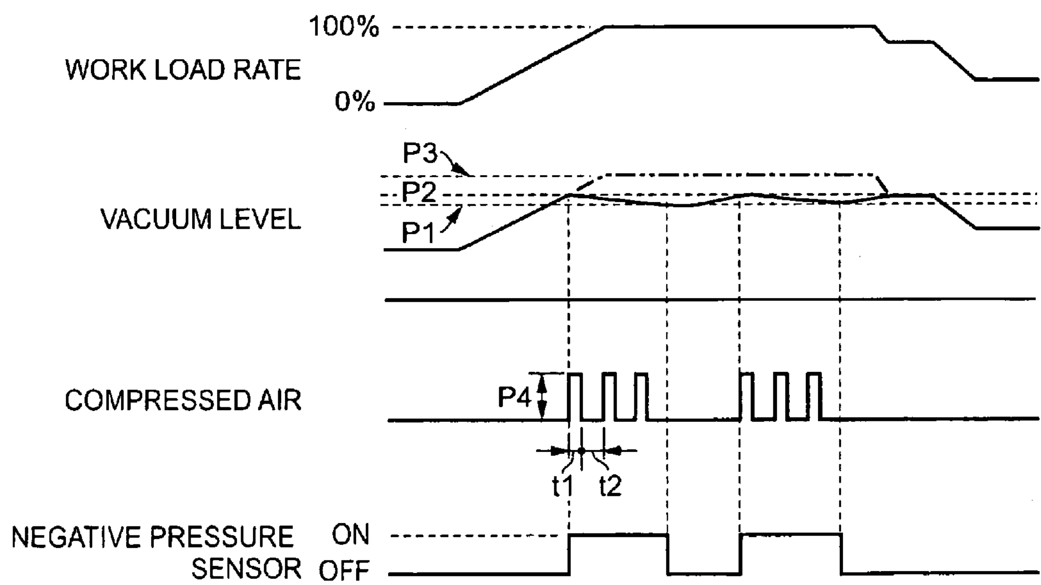
FIG. 2 shows an operational flowchart of the present invention.
Figure 3:
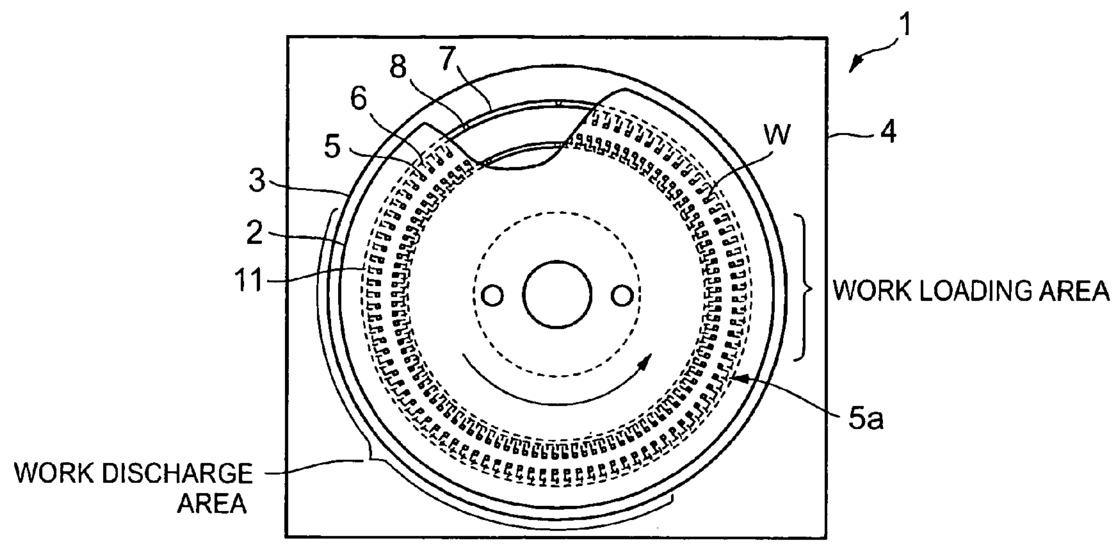
FIG. 3 is a plan view showing a work conveyor apparatus including the vacuum suction system of the present invention.
Figure 4:
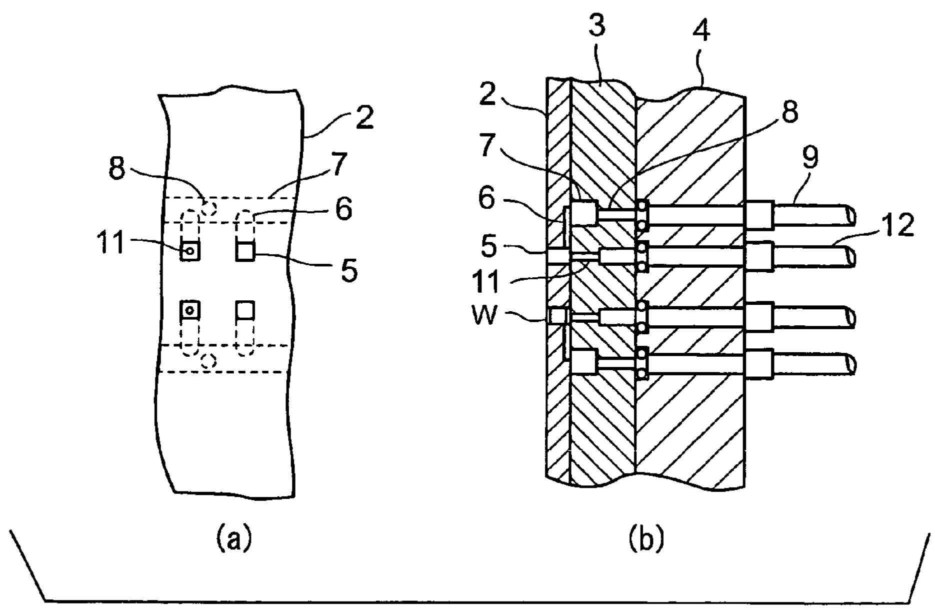
FIG. 4 is an enlarged view of the work conveyor apparatus in FIG. 3.
Figure 5:
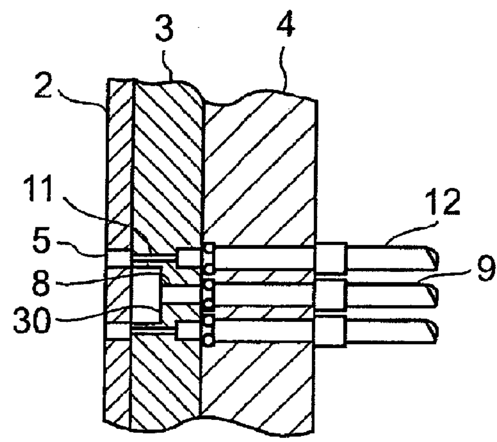
FIG. 5 shows a conventional vacuum suction system.
Figure 6:
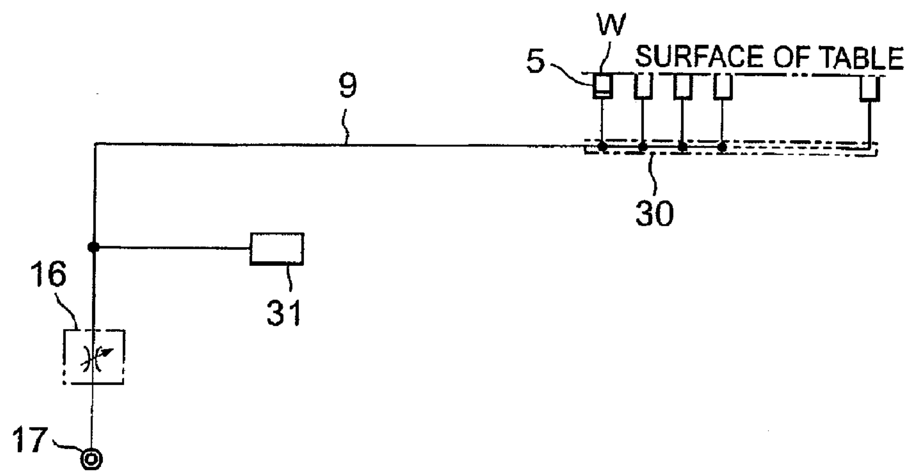
FIG. 6 shows a piping of the system described in FIG. 5.
Figure 7:
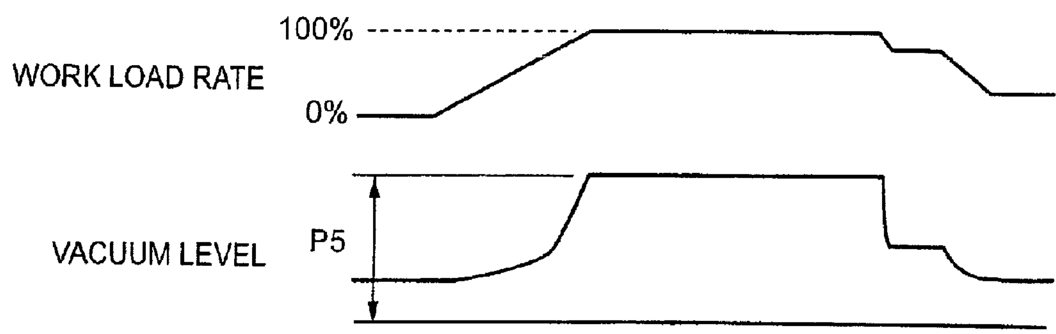
FIG. 7 shows a relationship between a work load rate and a vacuum level.

The embodiment of the present invention will now be explained with reference to the attached drawings. FIGS. 1-4 illustrate a vacuum suction system and method of controlling the same according to the present invention. FIG. 1 shows a piping of the vacuum suction system; FIG. 2 shows a flowchart illustrating the operations of the vacuum suction system; FIG. 3 is a plan view showing a work conveyor apparatus including the system of the present invention; FIG. 4(*a*) is an enlarged plan view of the work conveyor apparatus; FIG. 4(*b*) is a side sectional enlarged view of the work conveyor apparatus.

The present invention will be first explained with reference to FIGS. 3-4 showing the work conveyor apparatus including the vacuum system of the present invention. A work conveyor apparatus 1 shown in FIG. 3 has a table base 3 fixedly disposed on a base 4, and a conveyor table 2, which turns rotatably on the table base 3 and has a plurality of work receiving openings 5.

The work receiving openings 5 in the conveyor table 2 penetrate through and are arranged in the conveyor table 2 at fixed intervals. The plurality of work receiving openings 5 form receiving opening rows **5*a* having concentric circles. Vacuum suction channels 7 are disposed on a surface of the table base 3 on the side of the conveyor table 2 to generate negative pressure in the receiving opening rows 5*a* on the conveyor table 2. As shown in FIGS. 4**(*a*)(*b*), each work receiving opening 5 of the conveyor table 2 is connected to the corresponding vacuum suction channel 7 via a minute sectional suction channel 6. In this case, the minute sectional suction channels 6 are disposed on a surface the conveyor table 2 on the side of the table base 3. The vacuum suction channels 7 are connected to the vacuum pipes 9 via a plurality of vacuum suction openings 8 which penetrate through the table base 3 and base 4. The vacuum pipes 9 are connected with the vacuum supply parts 15, 17, and 20.

In a work discharge region of the work conveyor apparatus 1 shown in FIG. 3, a jetting nozzle 11 is disposed to penetrate through the table base 3 and the base 4 as shown in FIG. 4. The jetting nozzle 11 is connected to a compressed air controlling means (not shown) via a compressed air pipe 12.

In FIG. 1, the previously mentioned vacuum supply parts 15, 17, 20 comprise a vacuum level control part 15, a vacuum generation source 17 and a compressed air generation source 20. The vacuum level control part 15 comprises a vacuum flow throttle valve 16, a compressed air adjustment throttle valve 19, and a compressed air supply electromagnetic valve 18. A negative pressure sensor 10 is disposed on the vacuum pipe 9 to detect the vacuum level of the vacuum suction channel 7.

As shown in FIG. 1, a control part **10*a* is connected to the negative pressure sensor 10. This control part 10*a* controls the operation of the compressed air supply electromagnetic valve 18**.

In FIG. 1, the conveyor table 2 with its work receiving openings 5 and the table base 3 with its vacuum suction channels 7 constitute a vacuum leak generation part of the vacuum suction system. The vacuum pipe 9 and the vacuum generation source 17 constitute a vacuum generation mechanism. The negative pressure sensor 10, the control part **10*a*, the compressed air supply electromagnetic valve (adjustment part) 18, and the compressed air generation source 20** constitute a vacuum level adjustment mechanism.

Operation of the vacuum suction system of the present invention according to this embodiment will be explained below.

In FIG. 3, a work W is loaded into the work receiving opening 5 using a loading means (not shown) in the work loading area of the work conveyor apparatus 1. The work W loaded into the work receiving opening 5 is rotatably conveyed by the conveyor table 2, and thereafter discharged from the work receiving opening 5 in the work discharge area of the work conveyor apparatus 1 by means of a jet of compressed air from the jetting nozzle 11.

During this process, the negative pressure sensor 10 detects the vacuum level inside the vacuum pipe 9 connected to the work receiving opening 5 and the vacuum suction channel 7. In other words, the vacuum level of the vacuum leak generation part is detected.

A signal from the negative pressure sensor 10 is sent to the control part **10*a*, wherein the ON/OFF hysteresis process shown in FIG. 2 is carried out between the maximum level P2 and the minimum level P1. In other words, the compressed air supply electromagnetic valve 18 is operated by the control part 10*a* to turn ON when the control part 10*a* receives a signal from the negative pressure sensor 10 indicating that the vacuum level is higher than the maximum level P2, and the compressed air supply electromagnetic valve 18 is operated by the control part 10*a* to turn OFF when the vacuum level is below the minimum level P1**.

In FIG. 2, P3 indicates an extremely high level higher than the maximum level P2 at which the present invention's functions are carried out.

As mentioned above, the negative pressure in the vacuum suction channel 7, which is generated by the vacuum generation source 17 via the throttle valve 16, creates a further negative pressure in the work receiving openings 5, as the vacuum suction channel 7 communicates with each work receiving opening 5 through the minute suction channel 6.

Therefore, as shown in FIG. 2, as the work load rate rises, the vacuum level within the work receiving opening 5 and the vacuum suction channel 7 also rises. If the signal from the negative pressure sensor 10 reaches the maximum level P2, an ON signal is sent from the control part 10*a* in order to control the compressed air supply electromagnetic valve 18 so that the compressed air is jetted intermittently.

As the compressed air supply electromagnetic valve 18 is operated so as to jet compressed air intermittently, the compressed air P4 supplied from the compressed air generation source 20 is adjusted by the throttle valve 19 to be supplied into the vacuum pipe 9 intermittently based on the jetting time t1 and the pause time t2. In this way, the negative pressure in the vacuum suction channel 7 is controlled.

On the other hand, when the vacuum level in the vacuum suction channel 7 decreases, and the signal from the negative pressure sensor 10 reaches the minimum P1 level, the control part 10*a* turns off the operation signal to the compressed air supply electromagnetic valve 18 and the compressed air P4 is stopped. When the supply of the compressed air P4 is stopped, the vacuum level within the vacuum pipe 9 gradually increases and the operations mentioned previously are repeated. Through these operations, the vacuum level within the vacuum pipe 9 is stabilized between the maximum level P2 and the minimum level P1.

As shown in FIG. 4, the work receiving opening 5 and the vacuum suction channel 7 are connected by the minute sectional suction channel 6. FIG. 1 shows that this minute sectional suction channel 6 has a function similar to a stop valve because it has a flow resistance. Therefore, even if a work W is not loaded into the work receiving opening 5, the amount of air flowing to the work receiving opening 5 can be limited, and the decline in the vacuum level within the vacuum suction channel can be prevented.

In the previously explained embodiment, the compressed air is jetted intermittently using the compressed air supply electromagnetic valve 18, but the compressed air can also be jetted continuously. The work conveyor apparatus 1 is described, but the present invention can also be applied to any vacuum suction system in which there are large changes in pressure.

According to the invention explained above, the vacuum level in the vacuum leak generation part can be stabilized. In this case, if the work conveyor table with work receiving openings is used as a vacuum leak generation part, the works can be stably loaded into the work receiving openings, the works can be stably discharged from work receiving openings, and the works can be stably conveyed by the work conveyor table.

What is claimed is:

1. A vacuum suction system, comprising
a vacuum leak generation part,
a vacuum generation mechanism connected to the vacuum leak generation part, and
a vacuum level adjustment mechanism connected to the vacuum leak generation part, including a negative pressure sensor to detect a vacuum level of the vacuum leak generation part, and an adjustment part to adjust the vacuum level of the vacuum leak generation part based on a signal from the negative pressure sensor,
wherein the vacuum leak generation part includes a table base disposed on a side of the vacuum generation mechanism, a circular-shaped vacuum suction channel, a conveyor table rotatably mounted on the table base, and a plurality of work receiving openings penetrating through the conveyor table for receiving works therein, the work receiving openings being spaced apart from each other and arranged in a circular pattern,
each work receiving opening being disposed inwardly or outwardly in a radial direction relative to the vacuum suction channel,
each work receiving opening being connected to the vacuum suction channel through a minute sectional suction channel provided on the conveyor table,
each of the minute sectional suction channels having a longitudinal axis extending in the radial direction from the corresponding work receiving opening only to a point that is part way across a width of the circular-shaped vacuum suction channel, thereby providing a pressure resistance when the vacuum generation mechanism is operated, the negative pressure sensor detecting the vacuum level of the work receiving openings of the conveyor table, and
the adjustment part adjusting the vacuum level of the work receiving openings,
wherein the vacuum level adjustment mechanism includes a compressed air generation source for generating a first compressed air,
wherein the adjustment part is adapted to jet out the first compressed air from the compressed air generation source to the vacuum leak generation part based on the signal from the negative pressure sensor, and
wherein the adjustment part jets out the first compressed air based on the signal from the negative pressure sensor when the vacuum level rises above a maximum negative pressure, and stops the first compressed air when the vacuum level falls below a minimum negative pressure,
the maximum negative pressure being determined by an increased work load rate, and the minimum negative pressure being determined by a decreased work load rate,
wherein the minimum and maximum negative pressures are pressures which are less than atmospheric pressure,
wherein the minimum negative pressure is closer to the atmospheric pressure than the maximum negative pressure, and the maximum negative pressure is a lower absolute pressure than the minimum negative pressure,
wherein a jetting nozzle is disposed in a work discharge region to penetrate through the table base, the jetting nozzle being adapted to jet a second compressed air to the work receiving openings to discharge the work in each of the work receiving openings,
wherein the works are discharged smoothly and securely by the second compressed air from the jetting nozzle, regardless of a suction power from the vacuum suction channel determined by the work load rate, and
wherein the circular-shaped vacuum suction channel is disposed on a surface of the table base facing the conveyor table, and the minute sectional suction channels are disposed on a surface of the conveyor table facing the table base.

2. A vacuum suction system according to claim 1, wherein the vacuum level of the work receiving openings is securely stabilized by an operation of the adjustment part regardless of the work load rate of the work receiving openings, the increased work load rate, or the decreased work load rate.

3. A vacuum suction system according to claim 1, wherein each of the work receiving openings in the circular pattern is spaced apart in a radial direction relative to the vacuum suction channel.

4. A vacuum suction system according to claim 3, wherein each of the minute sectional suction channels connects the corresponding work receiving opening to the vacuum suction channel, which is spaced apart in the radial direction from the work receiving openings.

5. A vacuum suction system according to claim 3, wherein each of the minute sectional suction channels has a length which is less than a distance in the radial direction separating the corresponding work receiving openings and the vacuum suction channel plus the width of the vacuum suction channel.

6. A vacuum suction system according to claim 1, wherein the circular-shaped vacuum suction channel includes a first and a second circular-shaped vacuum suction channel which are spaced apart form each other in the radial direction, and the work receiving openings are spaced apart from each other and are arranged in two circular patterns, both of which are located between the first and the second circular-shaped vacuum suction channels.

7. A method of controlling a vacuum suction system according to the method of claim 6, wherein each of the minute sectional suction channels connects the corresponding work receiving opening to the vacuum suction channel, which is spaced apart in the radial direction from the work receiving openings.

8. A method of controlling a vacuum suction system according to the method of claim 6, wherein each of the minute sectional suction channels has a length which is less than a distance in the radial direction separating the corresponding work receiving openings and the vacuum suction channel, plus the width of the vacuum suction channel.

9. A method of controlling a vacuum suction system, comprising a vacuum leak generation part, a vacuum generation mechanism connected to the vacuum leak generation part, and a vacuum level adjustment mechanism connected to the vacuum leak generation part for adjusting a vacuum level of the vacuum leakage generation part, and including a negative pressure sensor to detect the vacuum level of the vacuum leak generation part, a compressed air generation source, and an adjustment part, wherein the vacuum leak generation part includes a table base disposed on a side of the vacuum generation mechanism, a circular-shaped vacuum suction channel, a conveyor table rotatably mounted on the table base, and a plurality of work receiving openings penetrating through the conveyor table for receiving works therein, the work receiving openings being spaced apart from each other and arranged in a circular pattern, each work receiving opening being disposed inwardly or outwardly in a radial direction relative to the vacuum suction channel, each work receiving opening being connected to the vacuum suction channel through a minute sectional suction channel provided on the conveyor table, each of the minute sectional suction channels having a longitudinal axis extending in the radial direction from the corresponding work receiving opening only to a point that is part way across a width of the circular-shaped vacuum suction channel, thereby providing a pressure resistance when the vacuum generation mechanism is operated, the negative pressure sensor detecting the vacuum level of the work receiving openings of the conveyor table, and the adjustment part adjusting the vacuum level of the work receiving openings, the method comprising the steps of:

generating a vacuum in the vacuum leakage generation part by the vacuum generation mechanism, detecting the vacuum level of the vacuum leak generation part by the negative pressure sensor of the vacuum level adjustment mechanism, and jetting out a first compressed air from the compressed air generation source to the vacuum leak generation part by the adjustment part of the vacuum level adjustment mechanism based on a signal from the negative pressure sensor, wherein the adjustment part jets out the first compressed air based on the signal from the negative pressure sensor when the vacuum level rises above a maximum negative pressure, and stops the first compressed air when the vacuum level falls below a minimum negative pressure, the maximum negative pressure being determined by an increased work load rate, and the minimum negative pressure being determined by a decreased work load rate, wherein the minimum and maximum negative pressures are pressures which are less than atmospheric pressure, wherein the minimum negative pressure is closer to the atmospheric pressure than the maximum negative pressure, and the maximum negative pressure is a lower absolute pressure than the minimum negative pressure, wherein a jetting nozzle is disposed in a work discharge region to penetrate through the table base, the jetting nozzle being adapted to jet a second compressed air to the work receiving openings to discharge the work in each of the work receiving openings, wherein the works are discharged smoothly and securely by the second compressed air from the jetting nozzle, regardless of a suction power from the vacuum suction channel determined by the work load rate, and wherein the circular-shaped vacuum suction channel is disposed on a surface of the table base facing the conveyor table, and the minute sectional suction channels are disposed on a surface of the conveyor table facing the table base.

10. A method of controlling a vacuum suction system according to the method of claim 9, wherein, the adjustment part jets out the first compressed air intermittently based on the signal from the negative pressure sensor when the vacuum level rises above the maximum negative pressure.

11. A method of controlling a vacuum suction system according to the method of claim 9, wherein the vacuum level of the work receiving openings is securely stabilized by an operation of the adjustment part regardless of the work load rate of the work receiving openings, the increased work load rate, or the decreased work load rate.

12. A method of controlling a vacuum suction system according to the method of claim 9, wherein each of the work receiving openings in the circular pattern is spaced apart in a radial direction relative to the vacuum suction channel.

13. A method of controlling a vacuum suction system according to the method of claim 9, wherein the circular-shaped vacuum suction channel includes a first and a second circular-shaped vacuum suction channel which are spaced apart form each other in the radial direction, and the work receiving openings are spaced apart from each other and are arranged in two circular patterns, both of which are located between the first and the second circular-shaped vacuum suction channels.

* * * * *